US009950237B2

(12) United States Patent
Kline et al.

(10) Patent No.: US 9,950,237 B2
(45) Date of Patent: Apr. 24, 2018

(54) SYSTEM, METHOD, AND APPARATUS FOR MONITORING SPORTING APPARATUS AND USERS THEREOF

(71) Applicant: Dunlop Sports Co., Ltd., Kobe-shi, Hyogo (JP)

(72) Inventors: Michael J. Kline, Newport Beach, CA (US); John Rae, Westminster, CA (US); Scott Carlyle, Kobe (JP); Kirk Bacon, Long Beach, CA (US); Patrick Ripp, Seal Beach, CA (US); Jeff Brunski, Los Angeles, CA (US); Jay Vogler, Huntington Beach, CA (US); Dustin Brekke, Fountain Valley, CA (US)

(73) Assignee: DUNLOP SPORTS CO., LTD., Hyogo (JP)

( * ) Notice: Subject to any disclaimer, the term of this patent is extended or adjusted under 35 U.S.C. 154(b) by 179 days.

(21) Appl. No.: 14/694,568

(22) Filed: Apr. 23, 2015

(65) Prior Publication Data

US 2016/0310820 A1 Oct. 27, 2016

(51) Int. Cl.
*A63B 71/06* (2006.01)
*A63B 69/00* (2006.01)
(Continued)

(52) U.S. Cl.
CPC ...... *A63B 71/0619* (2013.01); *A63B 24/0003* (2013.01); *A63B 69/00* (2013.01);
(Continued)

(58) Field of Classification Search
CPC .......... G06F 1/3206; G06F 3/00; G06F 3/014; G09B 19/0038; A63B 71/0619;
(Continued)

(56) References Cited

U.S. PATENT DOCUMENTS 6,226,416 B1 5/2001 Ohshima et al.
6,834,129 B2 12/2004 Asakura
(Continued)

OTHER PUBLICATIONS

U.S. Appl. No. 14/430,601, filed Mar. 24, 2015, Dunlop Sports Co. Ltd.
(Continued)

*Primary Examiner* — William H McCulloch, Jr.
*Assistant Examiner* — Yingchuan Zhang
(74) *Attorney, Agent, or Firm* — Baker Hostetler LLP

(57) ABSTRACT

A system may comprise one or more monitoring devices that may communicate with a mobile device or a wearable device worn by a user of a sporting apparatus. The system may enable motion data specific to motion of the sporting apparatus to be conveniently captured and transmitted, and displayed on the wearable device. The system may include functionality to permit disablement of the motion detecting, transmission, and/or displaying functions at times when such functions are not permitted to be used, and to record the date, time, and location when such functions have been disabled to permit verification thereof by a governing body or sporting organization. The system may further include a learning module enabling monitored motion of the object to be correlated to monitored motion of the user such that predictive motion of the sporting object based only on monitored motion of the user may be obtained and displayed.

16 Claims, 7 Drawing Sheets

(51) Int. Cl.
    *G06F 3/01*     (2006.01)
    *G09B 19/00*     (2006.01)
    *G06F 1/32*     (2006.01)
    *G06F 3/00*     (2006.01)
    *A63B 24/00*     (2006.01)
    *G06Q 10/06*     (2012.01)

(52) U.S. Cl.
    CPC ...... *A63B 69/0002* (2013.01); *A63B 69/0015* (2013.01); *A63B 69/0026* (2013.01); *G06F 1/3206* (2013.01); *G06F 3/00* (2013.01); *G06F 3/014* (2013.01); *G09B 19/0038* (2013.01); *A63B 2069/0008* (2013.01); *A63B 2071/0663* (2013.01); *A63B 2208/0204* (2013.01); *A63B 2220/18* (2013.01); *A63B 2220/62* (2013.01); *G06Q 10/0639* (2013.01)

(58) Field of Classification Search
    CPC . A63B 24/0003; A63B 69/00; A63B 69/0002; A63B 69/0015; A63B 69/0026
    See application file for complete search history.

(56) References Cited

U.S. PATENT DOCUMENTS

| | | | |
|---|---|---|---|
| 7,097,459 B2 | 8/2006 | Ueda et al. | |
| 7,388,969 B2 | 6/2008 | Miki et al. | |
| 7,502,491 B2 | 3/2009 | Shirai et al. | |
| 7,686,701 B2 | 3/2010 | Hasegawa | |
| 7,704,157 B2 | 4/2010 | Shirai et al. | |
| 7,857,708 B2 | 12/2010 | Ueda et al. | |
| 8,475,300 B2 | 7/2013 | Ueda | |
| 8,523,696 B2 | 9/2013 | Kamino et al. | |
| 8,540,583 B2 | 9/2013 | Leech | |
| 8,574,100 B2 | 11/2013 | Hasegawa et al. | |
| 8,617,005 B2 | 12/2013 | Moran et al. | |
| 8,657,707 B2 | 2/2014 | Ueda et al. | |
| 8,696,482 B1 | 4/2014 | Pedenko et al. | |
| 8,708,833 B2 | 4/2014 | Ueda | |
| 8,747,257 B2 | 6/2014 | Hasegawa et al. | |
| 8,758,151 B2 | 6/2014 | Kimizuka et al. | |
| 8,758,171 B2 | 6/2014 | Hasegawa et al. | |
| 8,787,006 B2 | 7/2014 | Golko et al. | |
| 8,926,444 B2 | 1/2015 | Kato et al. | |
| 8,992,347 B2 | 3/2015 | Moran et al. | |
| 2011/0305369 A1* | 12/2011 | Bentley | G06K 9/00342 382/103 |
| 2012/0035003 A1 | 2/2012 | Moran et al. | |
| 2012/0142443 A1* | 6/2012 | Savarese | A63B 71/06 473/199 |
| 2013/0196783 A1 | 8/2013 | Kamino | |
| 2013/0260923 A1 | 10/2013 | Okazaki et al. | |
| 2013/0267338 A1 | 10/2013 | Boyd et al. | |
| 2013/0288829 A1 | 10/2013 | Kimizuka et al. | |
| 2014/0038750 A1 | 2/2014 | Leech | |
| 2014/0216180 A1 | 8/2014 | Ueda | |
| 2014/0278220 A1* | 9/2014 | Yuen | G01B 21/16 702/150 |
| 2015/0033053 A1* | 1/2015 | Kim | G06F 1/3206 713/323 |
| 2015/0305655 A1* | 10/2015 | Sharpe | G09B 19/0038 2/67 |

OTHER PUBLICATIONS

U.S. Appl. No. 14/564,933, filed Dec. 9, 2014, Dunlop Sports Co. Ltd.

* cited by examiner

SYSTEM, METHOD, AND APPARATUS FOR MONITORING SPORTING APPARATUS AND USERS THEREOF

BACKGROUND

Sports enthusiasts of all skill levels in all sports are constantly striving to enhance their ability while progressing along The Journey to Better® path to improvement. This is especially true in sports such as golf, which is challenging to master, and challenging to maintain one's skill level in, once mastered.

For this reason, sports enthusiasts have turned to technical innovations in an effort to improve their game, including the use of monitoring devices used to determine and display information specific to the enthusiast, such as a golfer's swing path. Golfers and golf club equipment manufacturers have been increasingly relying upon sensors and monitors to evaluate a golfer's swing. Sensors and monitors may track conditions, such as club head speed, attack angle, launch angle, golf ball spin rate and spin direction, and so on. And sellers of golf club equipment, including outlets that specialize in golf club fitting, increasingly rely on such sensors and monitors to assist a prospective purchaser in selecting golf clubs that best match their particular golf swing characteristics.

One such monitoring device that is commercially available is the "SB2" sensor available from Swingbyte, LLC (previously Swingbyte, Inc.) of Chicago, Ill. Such sensors, as described in U.S. Pat. No. 8,696,482, incorporated in its entirety by reference herein, are typically removeably attached to the shaft of a golf club, for example with a clamping mechanism, or fixed to the shaft, for example, with an adhesive. As is now known by virtue of co-pending U.S. patent application Ser. No. 14/564,933, filed Dec. 9, 2014, assigned to the assignee of the present application, and incorporated in its entirety by reference herein, monitoring devices may also be placed within sporting apparatus, such as the head, shaft, and/or grip of a golf club.

Such monitoring devices, also termed "three-dimensional golf swing analyzers," work as an Inertial Measurement Unit (IMU), and typically include, for example, a three-axis accelerometer capable of producing and transmitting linear acceleration data, a three-axis gyroscope capable of producing and transmitting angular velocity data, a first microprocessor that receives data from the accelerometer and the gyroscope and processes the data, a first computer memory wherein the microprocessor stores the processed data, and a radio transmitter for transmitting the processed data from the first computer memory. MEMS (microelectromechanical systems) technology may be used for the accelerometer and the gyroscope. The monitoring device is typically powered by a battery or other suitable power source. A housing may be used to hold the microprocessor, accelerometer, gyroscope computer memory, radio transmitter, and battery.

Such monitoring devices capture and analyze golf swing (or other sporting apparatus motion) data by attaching the monitoring device to a golf club either below the grip or on the cap, or by integrating the sensor into the shaft or head. After hitting a shot or swinging the golf club (or other sporting apparatus) players and instructors can view an interactive, three-dimensional animation of the swing, along with key metrics, such as club head speed, path, plane, and various angles at impact. It is sometimes preferred to affix such monitoring devices at a position remote from the golf club head, due to the head's tendency to vibrate violently at the point of impact, potentially disrupting the monitoring device's attempts to measure the swing characteristics. Such monitoring devices may use a transmitter to send processed linear and angular movement data that defines a sporting apparatus swing, e.g., a golf club swing, to a receiver on a mobile device, such as a smart phone, tablet computer, or laptop computer. A computer application running on the mobile device may receive the processed data, process the data further and display a graphical representation of the entire swing with comprehensive statistics for every point of the swing. The processed data may be stored and later used along with theoretical data to coach a golfer or other sporting apparatus user on his or her swing.

As used herein, the term "monitoring device" is intended to mean a device that is configured to perform one of more of the following functions: to transmit and/or produce motion data, such as linear acceleration data and/or angular velocity data, to receive and/or process one or more of such types of motion data, to store such processed data, and/or to transmit the processed data, including without limitation devices such as the SB2 monitoring device previously described.

As used herein, the term "wearable device" is intended to mean a device normally worn by a user, and including a display that is readily viewable by the user in a hands-free manner, such as a watch or heads up display, including without limitation an Apple® Watch, and a Google Glass® device. In addition, a wearable device may include a golf glove having monitoring devices that can capture grip pressure on a golf club and relay the information back to the user, such as that seen in the SensoGlove® product, available at http://shop.sensoglove.com. This technology utilizes only the glove to gather and display the information, and does not require transmission of data, to a mobile device, for example.

As used herein, the term "mobile device" is intended to mean a device not normally worn by a user (or if worn, for example in a holster, having a display not readily viewable by the user while being worn), such as a smart phone, tablet computer, or laptop computer that is configurable to communicate with a wearable device and/or a monitoring device.

One of the practical problems facing sports enthusiasts, and golfers in particular, is the need to disable or remove monitoring devices from the sporting apparatus with which they are associated. For example, the USGA does not permit use of monitoring devices "on course" in order for the round being played to count, either for USGA handicapping purposes, or for competitive purposes, including both PGA Tour and amateur tournaments. It is thus necessary for any player having a monitoring device associated with his or her golf clubs to remove the device prior to playing a round of golf in order for that round not to be disqualified under USGA rules. While it may be a minor inconvenience to disable or remove such a device if it is merely clipped to the golf club shaft, or used on only one club, such removal or disabling becomes more cumbersome if all of the golfer's clubs (14 being the USGA limit) are equipped with such a device, or if the device is not removeably attached to the shaft, but is housed in the grip, for example, under a screw-off cap, or is housed in the club head, for example, according to the teachings of the aforementioned U.S. patent application Ser. No. 14/564,933.

Moreover, current systems do not readily permit a golfer who is practicing while playing a practice round, to readily view motion data in real time and after each shot, in order to adjust his or her swing, club, etc., without the need to fumble for a mobile device such as a smart phone to view a display of such data.

SUMMARY

The following presents a general summary of aspects of the disclosure in order to provide a basic understanding thereof. This summary is not an extensive overview of the disclosure. It is not intended to identify key or critical elements of the disclosure or to delineate the scope of the disclosure. The following summary merely presents some concepts of the disclosure in a general form as a prelude to the more detailed description provided below.

The present disclosure describes, in one aspect, a system comprising: a sporting apparatus comprising a monitoring device configured to transmit data corresponding to a user operating the sporting apparatus; a mobile device configured to receive the data transmitted by the monitoring device and to process the data for further transmission as displayable information; and a wearable device associated with the user configured to receive the data for further transmission from the mobile device and display the displayable information.

According to another aspect, the present disclosure describes a system comprising: a first sporting apparatus comprising a first monitoring device configured to transmit first data corresponding to a user operating the first sporting apparatus to impact a second sporting apparatus; a mobile device configured to receive the first data transmitted by the first monitoring device and to process the first data for further transmission as first displayable information; and a wearable device associated with the user configured to receive the first data for further transmission from the mobile device and to display the first displayable information; the second sporting apparatus comprising a second monitoring device configured to transmit second data corresponding to being struck by the first sporting apparatus.

According to another aspect, the present disclosure describes a system comprising: a sporting apparatus comprising a monitoring device configured to transmit first data corresponding to motion of the sporting apparatus; a wearable device associated with a user of the sporting apparatus configured to receive the first data and to acquire second data corresponding to motion of the user; and a learning module configured to correlate the first data with the second data and generate third data comprising an approximation of motion of the sporting apparatus.

In another aspect, the disclosure describes a sporting apparatus comprising a monitoring device, the monitoring device comprising a processor and a memory coupled with the processor, the memory comprising executable instructions that when executed by the processor cause the processor to effectuate operations comprising capturing motion data corresponding to motion of the sporting apparatus, and a transmitter configured to transmit displayable data based on the motion data to a wearable device intended to be worn by a user of the sporting apparatus for display of the displayable data on the wearable device.

In yet another aspect, the disclosure describes a method comprising acquiring first data indicative of motion of a sporting apparatus, acquiring second data indicative of motion of a user of the sporting apparatus, and correlating the first data to the second data to produce third data indicative of motion of the sporting apparatus based at least in part or based solely on motion of the user.

BRIEF DESCRIPTION OF THE DRAWINGS

The present disclosure is illustrated by way of example and not limited in the accompanying figures, in which like reference numerals indicate similar elements throughout, and in which.

DETAILED DESCRIPTION

As used herein, the term "monitoring device" is intended to mean a device that is configured to perform one or more of the following functions: to transmit and/or produce motion data, such as linear acceleration data and/or angular velocity data, to receive and/or process one or more of such types of motion data, to store such processed data, and/or to transmit the processed data, including without limitation devices such as the SB2 sensor previously described.

As used herein, the term "wearable device" is intended to mean a device normally worn by a user, and including a display that is readily viewable by the user in a hands-free manner, such as a watch or heads up display, including without limitation an Apple® Watch, a Google Glass® device, etc.

As used herein, the term "mobile device" is intended to mean a device not normally worn by a user (or if worn, for example in a holster, having a display not readily viewable by the user while being worn), such as a smart phone (e.g., Apple IPhone®), tablet computer (e.g. Apple iPad®), or laptop computer (e.g. Apple Mac Book®) that is configurable to communicate with a wearable device and/or a monitoring device.

As used herein, the term "sporting apparatus" means an object intended to be used in a game or sport by swinging at, capturing, hitting, throwing, or otherwise impacting another object (sports object) such as a ball, puck, punching bag, etc. including in both the actual and virtual realms. A sporting apparatus includes, but is not limited to baseball bats, softball bats, cricket bats, golf clubs, hockey sticks, tennis rackets, squash rackets, racquetball rackets, badminton rackets, or lacrosse sticks, a boxing glove, and further includes sports apparel, and devices such as video game controllers intended to mimic such sporting apparatus. A "sporting apparatus" may impact or be associated with an impact with a device such as a sporting object, and thus may also, for example, include a shoe configured to kick a soccer ball or football, or apparel, such as a golf glove, body suit, or helmet, that a user might wear when causing an impact. A sporting apparatus may have an impact area, which is an area of the sporting apparatus that normally impacts another sporting apparatus or sports object when participating in a sport. For example, an impact area may include some or all of a golf club head for golf, bat barrel for baseball, or the like. A non-impact area may be an area of the sporting apparatus that is not normally impacted by another sporting apparatus, such as a golf club shaft, racket handle, bat handle, or the like. While the disclosure refers, for convenience, primarily to golf clubs, golf club heads, and golf-related equipment, it should be understood that this is for brevity only, and that the teachings and disclosures herein are intended to apply to any sporting apparatus and any sports object, and not merely golf clubs and golf balls.

Figure 1:
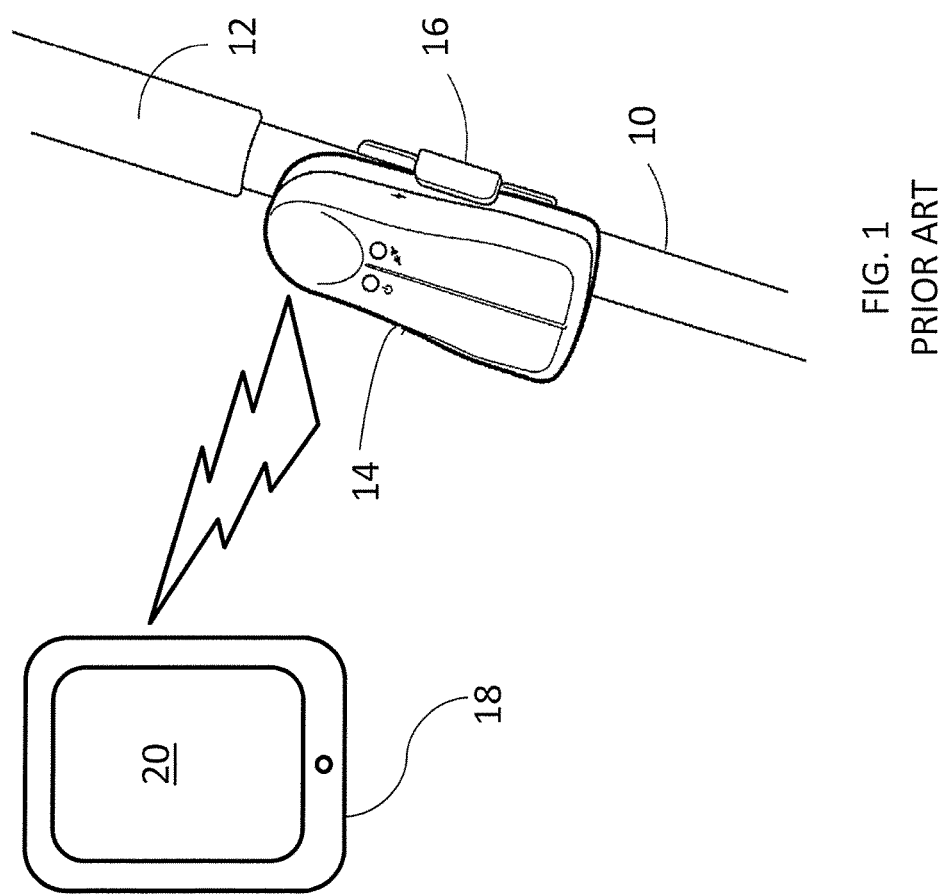
FIG. 1 is an illustration of a monitoring device of the prior art attached to a sporting apparatus, such as a golf club shaft.

Referring to FIG. 1, there is illustrated a sporting apparatus comprising a golf club shaft, generally 10, of the prior art, having a golf club head (not shown) affixed to a golf club shaft 10 and including a golf club grip 12. Also illustrated in FIG. 1 is a monitoring device 14, such as the Swingbyte SB2 sensor previously described, attached to the golf club shaft 10 as is known, for example, with a clamp or strap 16. Such monitoring devices 14 may be configured to transmit information, data, graphics, etc. to a remote device 18, such as a computer, laptop, tablet, smart phone, etc., where it may be accessed, displayed, or monitored on a display 20.

Figure 2:
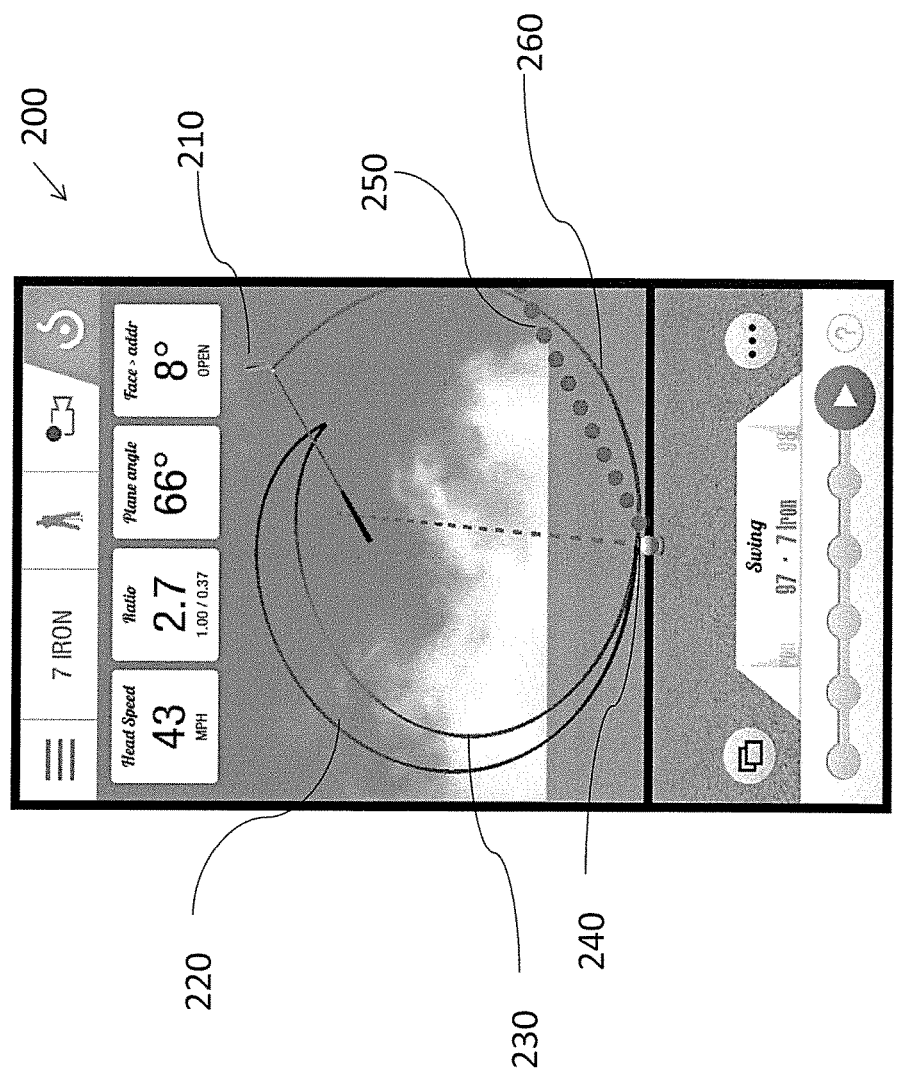
FIG. 2 is a schematic illustration of a graphic display of a swing path for a sporting apparatus such as a golf club, such as may be achieved using a monitoring device as shown in FIG. 1 and elsewhere herein.

Referring now to FIG. 2, there is illustrated a graphic display, generally 200, for a golf club swing path, such as achieved using a Swingbyte SB2-type sensor clamped or adhered to a golf club shaft as illustrated in FIG. 1. Such graphic display 200 may be displayed on a remote device, such as a mobile device (e.g., a smart phone, a tablet computer, or a laptop computer), or on a remote device comprising a desktop device such as a computer terminal Such graphic display 200 may be achieved using components and software embedded in the monitoring device and/or the remote device, as described in U.S. Pat. No. 8,696,482. While the example illustrated in FIG. 2 is specific to a golf club swing, and may display displayable information such as club head speed, plane angle, face angle at address, ball speed, attack angle, launch angle, azimuth, etc., in numeric and/or graphical terms, similar types of information indicative of motion of any sporting apparatus and/or sports object impacted by any such sporting apparatus may be similarly displayed, and are contemplated to be within the scope of the present disclosure and the term "displayable information" as used herein.

In addition, information relating to a user of the sporting apparatus may also be included in the term "displayable information" as used herein. For example, the user's hand position, wrist rotation, torso position, address angle, shoulder rotation speed, head rotation, head position, and/or other information pertaining to the user's operation of the sporting apparatus may be included in the term "displayable information."

The monitoring device may comprise a transmitter configured to transmit data specific to the swing path to the remote device for processing and displaying as the graphic display 200. As illustrated, the graphic display 200 may display a virtual golf club 210 in one or more swing positions, in this example, at the follow through position proximate the conclusion of a golf swing. As further illustrated, the graphic display 200 may display a swing path as recorded, sensed, and/or transmitted by the monitoring device. Such swing path as displayed may comprise a pre-impact backswing path 220, and a pre-impact downswing path 230, prior to the point of impact with a golf ball 240. The graphic display may further display a hypothetical post impact golf ball path 250 and a post-impact swing path 260. The monitoring device(s) may be mounted to the shaft of the golf club, in the grip, within the shaft, and/or within the golf club head. The monitoring device may be configured to determine and display data corresponding to the golf club at the point of impact, such as club head speed, azimuth, attack angle, etc.

Figure 3:
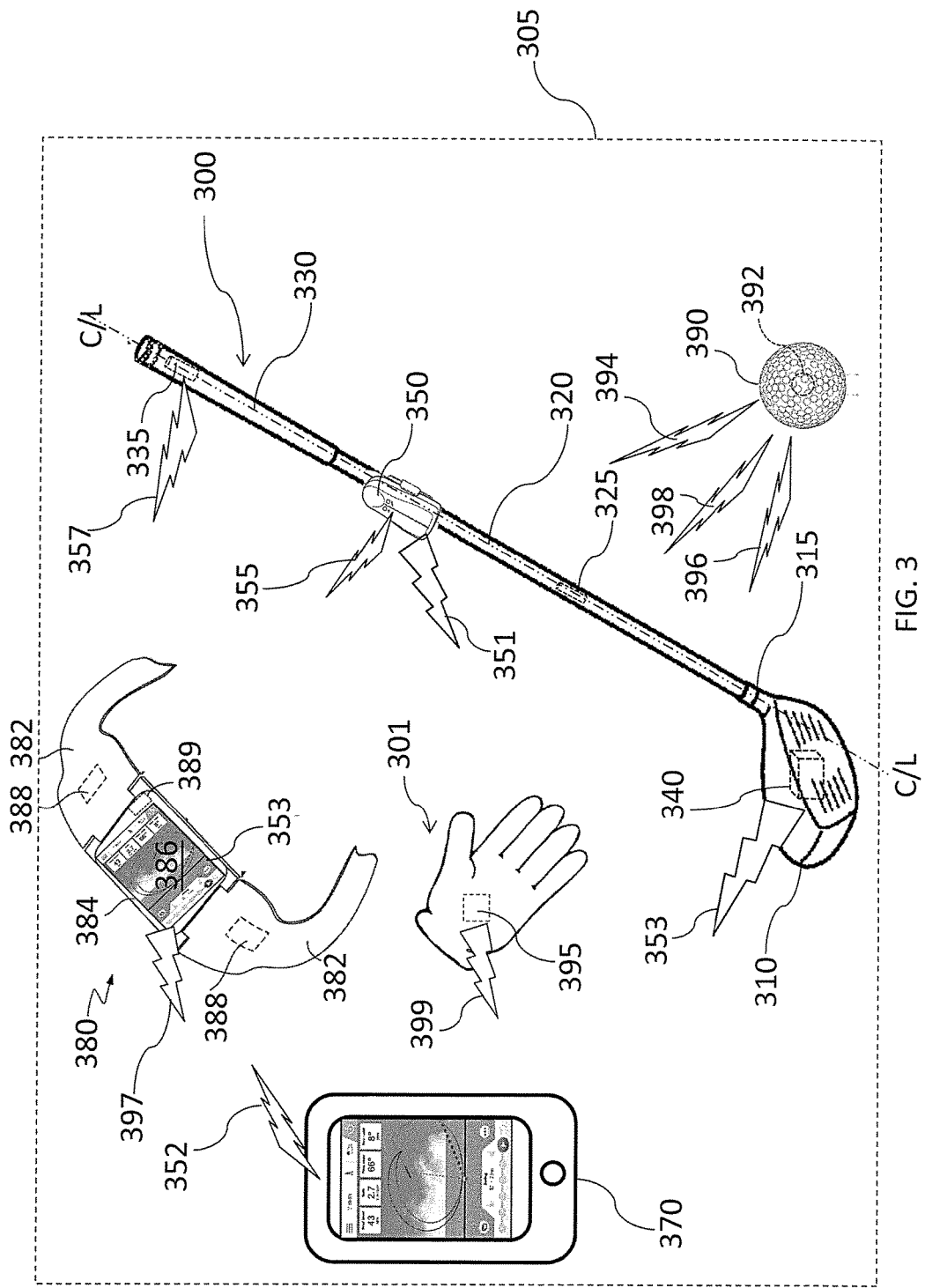
FIG. 3 is a schematic illustration of systems and apparatus of the present disclosure.

An aspect of the disclosure is a system 305 illustrated in FIG. 3. In this aspect, a golf club, generally 300, comprising a golf club head 310 connected via a hosel 315 to a shaft 320 having a grip 330 may be provided with a monitoring device 340 in the head, substantially as described herein or as described, as another example, in U.S. Patent Application Publication No. US 2013/0267338 A1, incorporated in its entirety by reference herein. In this aspect, the golf club 300 may additionally or alternatively comprise a monitoring device 350 that may, for example, be attached to the shaft 320, and exhibit substantially the same functionality as the monitoring device 340, in terms of sensing motion of the golf club 300 and processing, storing, and/or transmitting data pertaining thereto. The monitoring devices, for example monitoring devices 340, 350, may communicate with and/or be used in conjunction with a mobile device 370 such as a computer tablet, smart phone, laptop computer, etc., and/or be used in conjunction with one or more wearable devices, for example, a first wearable device 380 and/or a second wearable device 301. In this aspect, the monitoring device 340, monitoring device 350, related mobile device 370, first wearable device 380, and second wearable device 301 may be configured to receive, process, transmit, and/or display only the best data available from the monitoring device 340 and/or monitoring device 350, for example, as disclosed in co-pending U.S. patent application Ser. No. 14/564,933.

As another example, the golf club 300 may have additional or alternative monitoring devices, such as a monitoring device 325 within the shaft 320 and/or a monitoring device 335 within the grip 330, to provide multiple opportunities to capture the most accurate readings from multiple parts of the swing. As illustrated, the plurality of monitoring devices 325, 335, 340, 350 may be relatively evenly spaced along the golf club 300, for example, generally along the longitudinal axis or center line C/L of the sporting apparatus handle, shaft, hosel, etc. Other numbers of monitoring devices and spacing and monitoring device securing arrangements are of course contemplated herein. Of course, only one monitoring device, 325, 335, 340, or 350 may be employed.

In one aspect, a monitoring device 335 may be placed within the grip 330 or handle of the sporting apparatus. A commercially available example of an electronic device placed in the grip of a golf club is exemplified by the Game Golf™ shot tracking system, available from Active Mind Technology, Inc., which utilizes electronic components (referred to as "tags,") under a plug in the end of each golf club grip that communicate with a second electronic component (referred to as a "tracking device") worn on the user's belt, in order to track each club used for each shot on each hole on a golf course. Such devices are, for example, illustrated and described in U.S. Publication No. US20120035003 A1, published Feb. 9, 2012 and incorporated in its entirety by reference herein. Currently, however, the USGA does not permit golf clubs equipped with such devices to be used when a player participates in competitive play. Thus, a player with a full set of golf clubs fitted with such devices must first remove them from each club prior to commencing play. As discussed herein, devices associated with receiving motion data may be put in different modes based on a criteria. An exemplary use of the disclosed subject matter may be to automatically put a threshold number of monitoring devices associated with sporting apparatus that are in proximity to a location and/or each other in which such devices may not be used under certain rules in an "off" mode based on criteria as discussed herein. The threshold requirement, proximity requirement, and the other criteria may be set by a rules making body or an association, such as the USGA.

A preferred aspect of the present disclosure provides a system that enables the player to not only remove or turn on or power off the monitoring devices, but to place the system with which they are being used in "sleep" mode, to record the duration and time when in sleep mode, and/or record the location of the devices while in sleep mode, all of which may be recorded in a verifiable format, such as a date and time-stamped electronic signature, so the player might verify with the USGA or any other official or governing body that the monitoring devices, though contained on, or within, or otherwise associated with, the club(s) were non-functional and not functioning during the time the player was participating in a USGA or other sanctioned event at which such devices are not permitted for use. In this aspect, the "sleep" mode may be enabled by the mobile device, the wearable device(s), and/or the monitoring device(s), and may comprise software and functionality substantially similar to that used for placing a cellular telephone in "airplane" mode, but with the added functionality of recording the time and location during which the system was in sleep mode.

In some implementations, the "sleep" mode may only turn off the display and transmission of data to the user, but still track the data for transmitting over a network to an internet provider and/or a cable provider, for example. This modified "sleep" mode is referred to herein as a "local sleep" mode. In such an example, the "local sleep" mode may be enabled by the mobile device 370 wearable device 380, or wearable device 301 such that the user is incapable of utilizing, accessing, or visualizing the tracked information, and the system 305 may still record the time and location during which the system 305 is in "local sleep" mode, but the system 305 may transmit the data over the network. As such, the network provider and/or cable provider, such as a cable provider broadcasting a golf tournament, can still utilize the data created and transmitted by the system 305, such as data 352, 397, 353, 399, 396, 398, 394, 351, 355, and 357 that is transmitted or received by respective sensors or other devices, for example. The data may be broadcast along with a live broadcast, for example, to show a visual representation of the user's swing, or to provide more accurate tracking of shot distances and trajectories, distances from hazards and/or pin locations, golf ball location on the golf course, and other information. In this way, the "local sleep" mode may permit broadcasters to broadcast images similar to "Shot Tracker" images that show the flight path of a golf ball, but with the advantage of showing visual depictions of swing plane and other data not currently available.

In a related aspect, technologies similar or identical to those used to determine the flight path or position of a golf ball, such as "Shot Tracker" or "Shot Link" may be employed to track, for example, the swing path of a golf club in order to show the path of the backswing and downswing for a shot/player of interest, and display the swing path on a wearable device, a mobile device, and/or broadcast the same over a network, such as a cable provider broadcasting a golf tournament. Such technologies, which rely, inter alia, on lasers, wireless communication technologies, handheld devices, and related software, etc., may be employed by focusing, for example, on the head of the golf club, rather than (or in addition to) the golf ball itself, before, during, and/or after the swing. The swing path or track of the golf club head during the swing may thus be monitored, captured, displayed, and/or broadcast. In this aspect, such technologies may be employed from different vantages, for example, from behind the golfer, facing the golfer, or even above the golfer, for example using a drone-based system when on a golf course, or one that employs mounted cameras, sensor, lasers, etc., for example in a hitting bay of a fitting studio. When different vantage positions of the swing path are thus captured, the resulting data may be aggregated and displayed three dimensionally. Additionally or alternatively, two or more different vantages of the swing of a sporting apparatus may be captured and displayed to visualize, for example, a swing path from above, behind, in front of, beside, and/or facing the user of the sporting apparatus in different frames of view. In these aspects, it should be noted that it may be feasible to use such "Shot Tracker" or "Shot Link"-type technologies either with or without a monitoring device associated with the golf club or other sporting apparatus.

As is further illustrated in FIG. 3, the system 305 of the present disclosure may also comprise a first wearable device generally 380, which may be, for example, a Google Glass® device, or an Apple® Watch or similar device, such as described in U.S. Pat. No. 8,787,006, incorporated in its entirety by reference herein. The wearable device 380 may comprise a band 382, such as a wristband, headband, ankle band, arm band, leg band, or other attachment device for securing the wearable device 380 to a user, for example about the wrist, head, ankle, arm, or leg, respectively.

The wearable device 380 may further comprise a portable electronic device 384 which may comprise a display 386. The display 386 may be capable of displaying outputs to a user and/or may comprise a touch screen display capable of receiving touch inputs from a user. The portable electronic device 384 may have a native function, for example, as a watch, or a portable media player, and thus may provide media storage and playback.

Additionally, one or both of the band 382 (or other attachment vehicle, such as a glove or item of apparel) and the portable electronic device 384 may comprise one or more electrical components 388, 389, respectively, that may be coupled to other electrical components, either within the wearable device 380 or remote therefrom via wired or wireless means. As an example, the electrical component(s) 388, 389 may comprise at least one of an accelerometer, an antenna, a GPS receiver, a wireless communication transceiver, a haptic device, a printed circuit substrate, and/or a battery. As examples, the one or more antennas can be selected from the group of: a short-range wireless antenna (e.g., Bluetooth® antenna), a near-field antenna, or a Global Positioning System (GPS) antenna. The printed circuit substrate can, for example, be a flex circuit, rigid flex, or a Printed Circuit Board (PCB). The haptic device can be a vibrator, a piezo-electric device, or other device providing a user sensible condition. The battery can be rechargeable and can be used to power the band 382, the portable electronic device 384, and possibly also to charge a battery within the portable electronic device 384.

As is further illustrated in FIG. 3, the system 305 of the present disclosure may also comprise a second wearable device generally 301, which may be, for example, a golf glove or another article of clothing, such as a hat or shirt. The second wearable device 301 may comprise one or more monitoring devices, generally 395, capable of transmitting data 399 to at least one of mobile device 370 or first wearable device 380. The second wearable device 301 may perform functions and include features similar to those discussed with respect to the first wearable device 380 as described herein.

If the second wearable device 301 is a glove, data 399 may include information pertaining to the user's hand position on the sporting apparatus 300, the user's hand rotation and/or position throughout a swing, and/or the user's grip strength on the sporting apparatus 300 all utilized by the mobile device 370 and/or the first wearable device 380 in generating the displayable information 353.

If the second wearable device 301 is a hat, data 399 may include information pertaining to the user's head position before, during, and after the swing, or a rotation of the user's head and/or shoulders during the swing, for example, all utilized by the mobile device 370 and/or the first wearable device 380 in generating the displayable information 353.

As another example, if the second wearable device 301 is a shirt, data 399 may include information pertaining to the user's torso position before, during, and after a swing, and/or the speed of rotation of the user's shoulders during a swing, all utilized by the mobile device 370 and/or the first wearable device 380 in generating the displayable information 353.

It should be noted that although two wearable devices are illustrated in the system 305, any number of wearable devices may be implemented in the system 305 depending on the requirements of the system 305. For example, the system 305 may include the first wearable device 380 as a watch, the second wearable device 301 as a glove, and an additional wearable device as a hat, where each of the wearable devices is capable of receiving, transmitting, storing, and/or displaying data, such as data 397, 352, 399, 357, 351, 353 etc.

According to one aspect of the disclosure illustrated in FIG. 3, the system 305 may comprise a sporting apparatus 300 comprising one or more monitoring devices 325, 335, 340, and/or 350 configured to transmit (and/or receive) data 351, 353, 355, and/or 357 corresponding to a user operating the sporting apparatus 300, and a mobile device 370 configured to receive (and/or transmit) the data 351, 353, 355, 357, 352, and 399 transmitted by the monitoring device(s) and the wearable device(s) and to process such data for further transmission, for example, as transmitted data 352 to be displayed as displayable information 353, and a wearable device 380 associated with the user configured to receive the transmitted data, for example 352, 355 for further transmission and/or to be displayed as displayable information 353 on a display 386 associated with the wearable device 380. The displayable information 353 may comprise information substantially as described with respect to FIG. 2.

Both the mobile device 370 and the first wearable device 380 may comprise displays and may be configured to display the same displayable information 353, although the mobile device 370 need not display the displayable information 353, particularly when such information is displayable on the first wearable device 380. The data 351, 353, 355, and/or 357 transmitted by the monitoring device(s) and/or the data for further transmission 352 and/or the displayable information 353 may comprise at least one of velocity, acceleration, deceleration, attack angle, azimuth, impact, and swing path of the sporting apparatus 300. Such data may be displayed numerically and/or graphically.

According to another aspect, the system 305 may be configured such that at least one of the monitoring device(s), 325, 335, 340, and/or 350 the mobile device, 370, the first wearable device 380, and/or the second wearable device 301 comprises an "on" (or active) mode and an "off" (or sleep) mode, the "off" (or sleep) mode comprising functionality for disabling, blocking, jamming, and/or otherwise interrupting at least one of: the monitoring device's(s') ability to transmit data corresponding to a user operating the sporting apparatus, the mobile device's(s') ability to receive data transmitted by the monitoring device(s) and/or the wearable device (s), the mobile device's(s') ability to transmit displayable information to the wearable device(s), the wearable device's (s') ability to display the displayable information or transmit data 352 and/or 399 to the mobile device(s) or other wearable device(s), displaying (by one or more devices) data associated with the sporting apparatus, processing (by one or more devices) data associated with the sporting apparatus, and/or communicating (by one or more devices) data associated with the sporting apparatus, among other things.

The monitoring device(s), 325, 335, 340, and/or 350 the mobile device 370, the wearable device 380, and/or the second wearable device 301 may automatically receive (or provide instructions to other devices) to enter into "off" mode (or any sleep mode) based on criteria, such as location (e.g., GPS), type of sporting apparatus (e.g., bat, ball, golf club—7 iron, wood, etc.), time, and/or date, among other things. In an example, mobile device 370 may first check a calendar of sporting events occurring at the location of the mobile device 370 (or communicatively connected wearable or monitoring devices) at a certain time and date. The mobile device 370 may enter into (or provide instructions to other devices to enter into) "off" mode (e.g., any sleep mode discussed herein), from "off" mode to "active" mode, or the like. The calendar may be locally stored on mobile device 370 or stored remotely, such as on a server associated with the USGA or another sports organization. In another example, where there is a system of mobile device 370, monitoring device 350, and/or wearable device 380, one or more of the devices may be selectively put in an "on" or "off" mode (e.g., sleep mode) based on criteria as discussed herein. Therefore, in this example, mobile device 370 may be left in an active state, while monitoring device 350 and wearable device 380 are in an "off" mode.

In yet another aspect, at least one of the monitoring device(s), the mobile device, and/or the wearable device(s) of the system 305 may comprises a tracking module configured to record a time period in which at least one of the monitoring device, the mobile device, and/or the wearable device is in the "off" (or sleep) mode. In another aspect certain security credentials (e.g., username and/or password, smart card, pin, or the like) may be needed to access when at least one of the monitoring device(s), the mobile device, and/or the wearable device(s) of the system 305 are in an "off" mode.

In another aspect, the sporting apparatus comprises a golf club, and the system comprises a plurality of golf clubs, with at least one of the golf clubs of the plurality of golf clubs comprising the monitoring device. In another aspect, all of the golf clubs comprising the plurality of golf clubs comprise one or more monitoring devices.

In another aspect the monitoring device(s), mobile device, and/or wearable device(s) comprise a port configured to receive a wired connection in order to upload stored data corresponding to a user operating the sporting apparatus, enabling a user to upload such data from the monitoring device, the mobile device, and/or the wearable device(s) to a computing device for one or more of storage, processing, transmitting, and display.

In the various disclosures discussed herein, the first wearable device 380 and/or the second wearable device 301 can include a haptic device. As examples, the haptic device can be a vibrator device or a piezo-electric device. The haptic device can produce a vibration or other tactile signal that is capable of being sensed by the user. Since the haptic device can be positioned in an attachment device such as a wristband, an ear piece, an ankle band, etc., it may be positioned proximate the user's wrist, ear, ankle, respectively, or proximate any other part of the body that can sense haptic sensory feedback. As a result, only minimal vibration is needed to be adequately sensed by a user. Advantageously, in some examples, the vibration can be non-audible to nearby persons and only detectable by the user. As another advantage, by providing the haptic device proximate to the user's wrist, ear, or ankle, it is unlikely that a user would miss a notification because of not sensing the vibration. Other examples may include a range of minimal to substantial (even possibly audible) vibration to correspond to a preferred or deviation from a preferred movement.

In an aspect of the disclosure, the haptic device may be utilized to provide immediate feedback to a user regarding use of a sporting apparatus with which the user is associated. In this aspect, the first wearable device 380 and/or the second wearable device 301 may be configured to provide haptic sensory feedback corresponding to the user operating the sporting apparatus 300 in substantial conformance with, and/or in substantial deviation from, a predetermined path of motion. For example, in the context of a golf swing, the system 305 may be configured to recognize when a golfer's swing is "on plane," a term generally understood to correlate with a fluid swing following a recommended swing path for optimal ball striking. This "on plane" swing path is sometimes approximated with reference to a Hoola Hoop® or similar structure positioned at an appropriate angle relative to the user at address and the target. The system 305 may be configured to provide appropriate haptic feedback in response to a swing being "on plane," for example, signaling the first wearable device 380 to provide one short vibration for a swing that is "on plane," two short vibrations for a swing that is "over the plane," and three short vibrations for a swing that is "under the plane." Other signals for other motions may likewise be used, for example, a vibration pattern, audible signal, and/or visual signal may be used to signal whether or not a golfer's (or user of other sporting apparatus) swing is within an acceptable range of azimuth, for example of zero degrees, within an acceptable attack angle, etc.

In yet another aspect, the system may comprise an alert or other warning system to inform a user that the system is or is not disabled or in "off" or sleep mode when the user approaches a location at which it may be desirable to either able or disable the system. For example, in the case of a user who is a golfer, and whose golf clubs are configured with one or more monitoring devices, the user may wish to be reminded to disable such devices prior to commencing a golf round at an event where such devices are not permitted to be used. According to the present disclosure, one or more devices associated with the system may be configured to alert the golfer in that event, for example, employing a haptic device to vibrate as a reminder to the golfer to disable the system before commencing the golf round. This may be achieved, for example, via a location module associated with, for example, the wearable device, the mobile device, and/or the monitoring device, configured to identify when the user, the user's sporting apparatus, and/or one or more of the aforementioned devices are located at or near a location associated with restrictions for use of such devices, such as a golf course.

In another aspect of the disclosure, the first wearable device 380 and/or the second wearable device 301 can include a heart rate monitor. For example, the first wearable device 380 may be a watch, and may include a heart rate monitor as one of electronic components 388. In such an example, the heart rate of the user may be used to generate calorie tracking information. In addition, the heart rate may be presented to the user on the display of the mobile device 370 or on the display 386 of the first wearable device 380 and/or on a display of the second wearable device 399. The heart rate may indicate to the user that they need to relax or calm down, or may indicate that the user should increase heart rate to activate blood flow, for example by deep breathing. In another example, when the heart rate of the user reaches a predetermined threshold level, either high or low, at least one of the mobile device 370, the first wearable device 380, and/or the second wearable device 301 may provide a notification to the user. The notification may include a sound, such as a soothing song to lower the heart rate of the user, or another sound that indicates to the user that the user should take a moment to relax, or take a moment to get blood flowing by moving around, doing stretches, or the like. As discussed herein, sensed data, user preferences, and/or determined relationships of information (e.g., correlated data), among other things may be used in determining the actions by a device, which may include display of information associated with performance. In an example, a relationship between heart rate and swing path of a player may be determined to be indicative of a flight path and/or ball travel distance from a tee. This relationship can be displayed graphically and/or numerically. The type of music that corresponds with appropriately changing a user's heart rate (e.g., based on a user preference) may be selected based on the determined heart rate for a desired performance.

In yet another aspect, the first wearable device 380 and/or the second wearable device 301 can include a microphone and/or a speaker, in addition to a microphone and/or speaker in the mobile device 370. During use of the system 305 the microphones and speakers within the mobile device 370 and the first and second wearable devices 380 and 301, respectively, may be utilized to provide notifications, feedback, voice input, etc. to allow communication between the devices and the user. For example, the speakers may be used to provide the user feedback about heart rate, or other vital stats as described above. In yet another example, the speakers may be used to audibly indicate to the user distances on the course, such as distance to the green or distance to a hazard. The user may also be able to communicate through a microphone with the system 305 in order to request information and/or change settings, for example.

In another aspect of the disclosure, the system 305 may comprise a first sporting apparatus 300 comprising a first monitoring device 325, 335, 340, and/or 350, configured to transmit first data, for example 351, corresponding to a user operating the first sporting apparatus 300 to impact a second sporting apparatus, 390, in this example a golf ball. In this aspect, the mobile device 370 may be configured to receive the first data 351 transmitted by the first monitoring device, for example 350, and to process the first data 351 for further transmission 352 as first displayable information 353. The first displayable information may comprise, for example, at least one of velocity, acceleration, deceleration, attack angle, and swing path of the first sporting apparatus 300.

In this aspect, the system 350 may also comprise a first wearable device 380 associated with the user configured to receive the first data for further transmission from the mobile device 352 and to display the first displayable information 353. In this aspect, the second sporting apparatus 390 may comprise a second monitoring device 392 configured to transmit second data, 394, 396, and/or 398 corresponding to being struck by the first sporting apparatus 300. In this aspect, the second monitoring device 392 may be configured to transmit the second data, 394, 396, and/or 398 to at least one of the first monitoring device, 350, the mobile device, 370, and the wearable device, 380, respectively. The system may be further configured to process the second data for display on the first wearable device 380 as second displayable information. The second data may comprise, for example, after the second sporting apparatus 390 is struck by the first sporting apparatus 300, at least one of velocity, acceleration, deceleration, compression, spin rate, launch angle, azimuth, spin direction, location, altitude, flight distance, and flight path of the second sporting apparatus 390, any or all of which may be displayed as the second displayable information, for example, on the first wearable device 380. In this aspect, particularly where location, flight path, altitude, and/or flight distance of the second sporting apparatus 390 is desired, it may be beneficial to include GPS or other tracking functionality within the second sporting apparatus 390. The first wearable device 380 may be further configured to "toggle" between display of the first displayable information, for example, that information specific to motion of the first sporting apparatus 300, and the second displayable information, for example, that specific to motion of the second sporting apparatus 390.

While the second monitoring device 392 is illustrated in FIG. 3 as being embedded or contained within the second sporting apparatus 390, it will be readily appreciated that the second monitoring device 392 and/or components thereof may be positioned on or near the surface of the second sporting apparatus 390. The first sporting apparatus 300 may, for example, be selected from the group comprising a golf club, a tennis racket, a squash racket, a racquetball racket, a baseball bat, a softball bat, a cricket bat, a hockey stick, a sports shoe, a boxing glove, sports apparel, a virtual sporting apparatus such as a Wii stick or other controller, or a lacrosse stick, and the second sporting apparatus 390 may be selected from the group comprising a golf ball, a tennis ball, a squash ball, a racquetball, a baseball, a softball, a cricket ball, a hockey puck, a soccer ball, a football, a punching bag, a virtual ball, and a lacrosse ball.

The system illustrated in FIG. 3 comprises in one aspect, at least one monitoring device, 325, 335, 340, and/or 350, a mobile device, 370, a first wearable device 380, and a second wearable device 301. A mobile device 370 may be necessary in situations where the first wearable device 380 has insufficient computing capability, battery power, etc., to perform the functions described herein. But in other aspects, the wearable device 380 may be provided with sufficient computing capability, battery power, transceiver capability, etc., to function without the need of a separate mobile device 370. Stated otherwise, the mobile device 370 and first wearable device 380 may be configured as a single wearable device comprising the functionality needed to perform the operations disclosed herein. Additionally or alternatively, the first wearable device 380 may be configured with the motion sensing and other features of the monitoring device(s) 340, 325, 350, 335. In this aspect, all of the functionality of the mobile device 370, first wearable device 380, and monitoring device(s) may be contained in a single unit comprising the first wearable device 380. In such an example, the first wearable device 380 may receive additional data 399 from the second wearable device 301, and/or from any number of wearable devices within the system 305.

In another aspect of the disclosure, the mobile device 370, first wearable device 380, the second wearable device 301, and/or any other devices included in system 305 may be configured to transmit the data, such as data 352, 397, 399, 351, 355, 357, 353, 394, 398, and 396, over a network. For example, at least one of the devices may transmit the data over a network to social media, such as Facebook, Twitter, or the like. In addition, each of the devices may transmit the data for real time broadcast to any number of media outlets, such as to cable providers, network providers, or the like. In such examples, the data transmitted by the devices may be received and viewed by friends, family, and/or the general public.

In one example, a golf tournament may be broadcast to viewers through an internet provider or a cable provider, and the data received by the providers from the devices in system 305 may be broadcast along with the golf tournament broadcast to provide insight into the swings, location, and/or other information relating to the users of system 305 in the golf tournament.

For another example, users of the system 305 may upload data before, during, or after utilizing the system 305 to social media for friends of the user to view, or may upload the data to a program that keeps a record of all rounds of golf played, each shot hit, and the like so that the user can view the information at a later time. For example, the system 305 may utilize any number of the devices in system 305 to track each swing, location of the swing, shot distances, and any other information gathered by the system 305, to allow the user to playback, review, and/or utilize the information to help improve their game. As such, the user may be capable of reviewing each shot through each round of golf to determine various aspects of their game that lead to better and worse play, so that the user can mimic and/or change their swing or approach to certain situations in the game.

In yet another aspect of the disclosure, the system 305 may be configured to utilize all the data previously recorded by the system 305 to recommend swing changes, club choices, and/or approaches to the game. For example, the user may consistently hit their 7 iron shorter than the target distance of 150 yards, so when the GPS within the mobile device 370 determines that the user is 150 yards away from the green, the mobile device 370 may communicate to the user a recommendation to use a 6 iron. As such, the system 305 can learn, dynamically, the playing ability and style of the user and use the data to recommend real time recommendations to the user. Such a system 305 may also access real time environmental data, such as wind direction and wind speed, based on the user's location, and may further use such data to recommend how the user may compensate for such environmental conditions, for example, by aiming 20 yards left and clubbing "up" from a 7 iron to 6 iron in order to compensate for a partial cross wind blowing left to right and toward the user, for example.

The system 305 may further be configured to learn the optimal stance, ball alignment, and swing type of the user and recommend to the user, before, during, or after a swing, adjustments that the user can make to hit more consistent and/or better shots based on the prior data and learning of the system 305. For example, in an implementation where the second wearable device 301 is a shoe, the monitoring device 392 may communicate with the second wearable device 301 to determine the distance between the monitoring device 392 and the monitoring device 395 in the second wearable device 301 for each different club. The system 305 can track the distance data, such as data 396 and/or data 399, for good and bad shots, and utilize the distance data to recommend to the user a proper distance for each shot for each different club. For example, the system 305, through use of the speaker and/or display on the mobile device 370, may recommend that the user step closer or further away from the second sporting apparatus 390 prior to each shot, and/or recommend that the user line up the second sporting apparatus 392 more forward or more rearward with respect to the second wearable device 395. Similar tracking and recommendations may occur for hand grip location on the club, length of the backswing, length of the forward swing, body rotation, and/or other information related to the swing of the user. Length of the swing refers to the distance the golf club head 310 of the first sporting apparatus 300 travels from address to the top of the backswing for the backswing length, and from the top of the backswing to striking the ball for the forward swing length. According to some measures of golf performance, the ratio of the backswing length to the forward swing length should be greater than 1. As an example, tour professionals typically exhibit a forward swing length that is at least about 10% less than backswing length, and potentially up to about 30% less than backswing length. The system of the present disclosure can determine the ratio of backswing to forward swing length and display the same for each shot, and may further accumulate such data in order to determine averages for the user.

In yet another aspect of the present disclosure, the system 305 may provide the data on the display of the mobile device 370 or on the display 386 of the first wearable device 380, for example, concurrently with data relating to a prior swing by the user and/or a prior swing of another person, such as a professional golfer. For example, if the user is utilizing the system 305 at a course they have previously played, or that a professional golfer has previously played, the system 305 may display to the user, before, during, or after each swing, a visualization of the user or the professional golfer's previously recorded swing. As such, the user can visually compare their swing attributes, swing result, and/or other information with their previous swings and/or the professional golfer's previous swings. In such an example, the system 305 may query the user and/or automatically present to the user, when the user is within a predetermined distance, such as 10 feet, from where the user and/or the professional golfer took a previously recorded swing, if the user desires to view and/or compare their swing to their previous swing or to the professional golfer's previous swing.

In another aspect, the system 305 illustrated in FIG. 3 may be configured with learning functionality permitting, for example, the first wearable device 380 to learn a user's swing (or other motion, such as kick, punch, etc.) profile based, at least in part, on motion data transmitted by the monitoring device(s) and/or the mobile device 370, and/or the first wearable device 380 and/or the second wearable device 301, potentially enabling the user to rely on using only the wearable device(s) once the learning is complete. In this aspect, the system 305 may comprise a sporting apparatus 300 comprising a monitoring device 325, 335, 340, and/or 350 configured to transmit first data 355 corresponding to motion of the sporting apparatus 300, and a first wearable device 380 associated with, for example, attached to, worn by, or otherwise monitoring motion, position, or location of a user or a body part of a user of the sporting apparatus 300. The first wearable device 380 may be worn by the user, but may also comprise or be associated with devices that remotely monitor motion, position, or location of a user for display on the wearable device 380. The wearable device may be configured to receive the first data 355 and to acquire second data corresponding to motion of the user. This first data 355 may be data captured by one or more of the monitoring devices 325, 335, 340, and/or 350, corresponding to the user taking one or more swings of the sporting apparatus 300. This first data 355 may thus comprise aggregated data that may be representative of an average swing by the user of the sporting apparatus 300. Because the monitoring device capturing and transmitting such data is associated with the sporting apparatus 300 itself, it may represent a more accurate depiction of user's swing profile than a monitoring device more remote from the point of impact, such as that contained in the first wearable device 380. In the case of the sporting apparatus 300 comprising a golf club, one of the best locations for positioning a monitoring device is within or proximate the golf club head, as for example, monitoring device 340, as such location is more proximate the point of impact. Other locations, of course are possible, such as the lower shaft, as with monitoring device 325, mid shaft, as with monitoring device 350, and within the grip region, as with monitoring device 335.

The second data corresponding to motion of the user may be acquired, for example, by configuring the first wearable device 380 with a monitoring device which may comprise, for example, one, more, or all of: a three-axis accelerometer capable of producing and transmitting linear acceleration data, a three-axis gyroscope capable of producing and transmitting angular velocity data, a first microprocessor capable of receiving data from the accelerometer and the gyroscope and processing the data, a first computer memory wherein the microprocessor stores the processed data. An optional radio transmitter for transmitting the processed data from the first computer memory, while not needed in this aspect, may nonetheless be provided. MEMS (microelectromechanical systems) technology may be used for the accelerometer and the gyroscope. The monitoring device in the first wearable device 380 may, for example, comprise one of the electronic components 388 within the band 382, or may comprise the electronic component 389 within the portable electronic device 384, and may be powered by a battery or other suitable power source.

The first wearable device 380, second wearable device 301, mobile device 370, and/or the sporting apparatus 300 itself may be further configured with a learning module, which may comprise, for example, the electronic components 388 and/or 389, and may be configured to correlate and/or calibrate the first data with the second data corresponding to the motion of the user, and generate third data comprising an approximation of motion of the sporting apparatus 300 based at least in part on motion of the user. For example, a user may take four swings with a seven iron, and may be advised to progressively increase swing speed with each swing, generating club head speeds of 43, 48, 53, and 56 miles per hour, which may be recorded by the system, for example, by the monitoring device 350 attached to the 7-iron. The monitoring device associated with the first wearable device 380, however, may, based on the same four swings of the 7-iron, record swing speeds of only 31, 37, 43, and 50 miles per hour, respectively, as the user's wrist, to which the first wearable device 380 and hence monitoring device associated therewith is attached, generally moves at a slower velocity at the point of impact than does the club head. The learning module may be configured to correlate these multiple data points to arrive at a predictive relationship of the user's wrist swing speed to club head speed, as illustrated schematically in FIG. 4. Such data may be extrapolated above and below the range of the four representative user swing speeds, and at all points there between, to arrive at predictive club head speeds for any user (for example wrist or hand) swing speed. In addition, in one aspect, where the system 305 comprises more than one wearable device, each wearable device may be used to create additional predictive relationships dependent on the location of each wearable device on the user. For example, if a second wearable device is a shirt, the learning module may be configured to correlate multiple additional data points related to the user's torso speed, in addition to the data points from the first wearable device 380, to arrive at a predictive relationship of club head speed.

Figure 4:
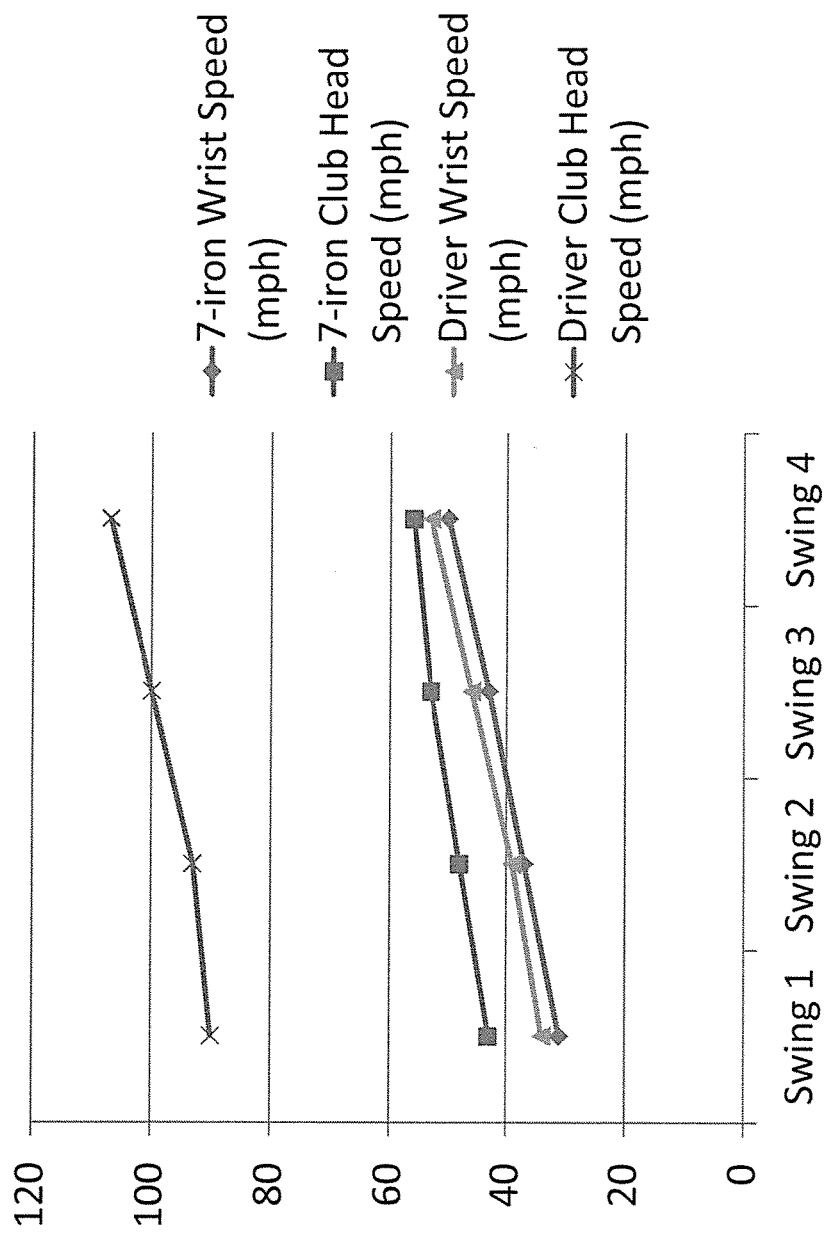
FIG. 4 is a schematic illustration of a method of correlating a user's hand or wrist speed motion to the speed of a sporting apparatus, such as a golf club head achieved by such motion.

It should here be noted that a user's swing speed as measured, for example, at the user's wrist or hand by a first wearable device 380, will, for the same swing speed of the user, generally produce faster club head speeds as the length of the club increases. This is exemplified schematically in FIG. 4, illustrating that at any given swing speed of the user's wrist, the differential between that speed and the speed of the club head will be greater, for example, for a driver club than for a shorter club such as a 7-iron. In this aspect, it may be desirable to configure, as part of the method disclosed herein, every club of the user with an RFID chip or tag that can communicate which club the golfer is using to the learning module, the wearable device, the mobile device, and/or the monitoring device associated with the sporting apparatus, such that the appropriate correlation between the user's swing (for example wrist) speed and the club head speed for the specific club being used may be achieved. The learning module (not shown) may be distributed and based, for example, within one or more devices, such as the wearable device 380, the mobile device 370, and/or the monitoring device 325. The learning module (not shown) may be a stand-alone device communicatively connected with other devices, such as the wearable device 380, the mobile device 370, and/or the monitoring device 325.

It should be understood that while the user's wrist (or hand) speed and club head speed have been discussed in connection with one of the aspects of the disclosure, that the correlative aspects enabling a wearable device or a mobile device associated with a wearable device to "learn" may be applied to any aspect of the sporting apparatus' motion relative to the user's motion in order to generate an approximation of the sporting apparatus' motion based on the user's motion. As another example, the system may acquire first swing data from a monitoring device associated with a sporting apparatus, and second swing data associated with motion of the user, for example, as determined by at least one wearable device being worn by the user. The system may correlate the first and second swing data to produce third swing data which may be displayed on the wearable device. In this example, the swing data may comprise data illustrative of a golfer's swing, such as swing arc, swing plane, attack angle, etc.

Figure 5:
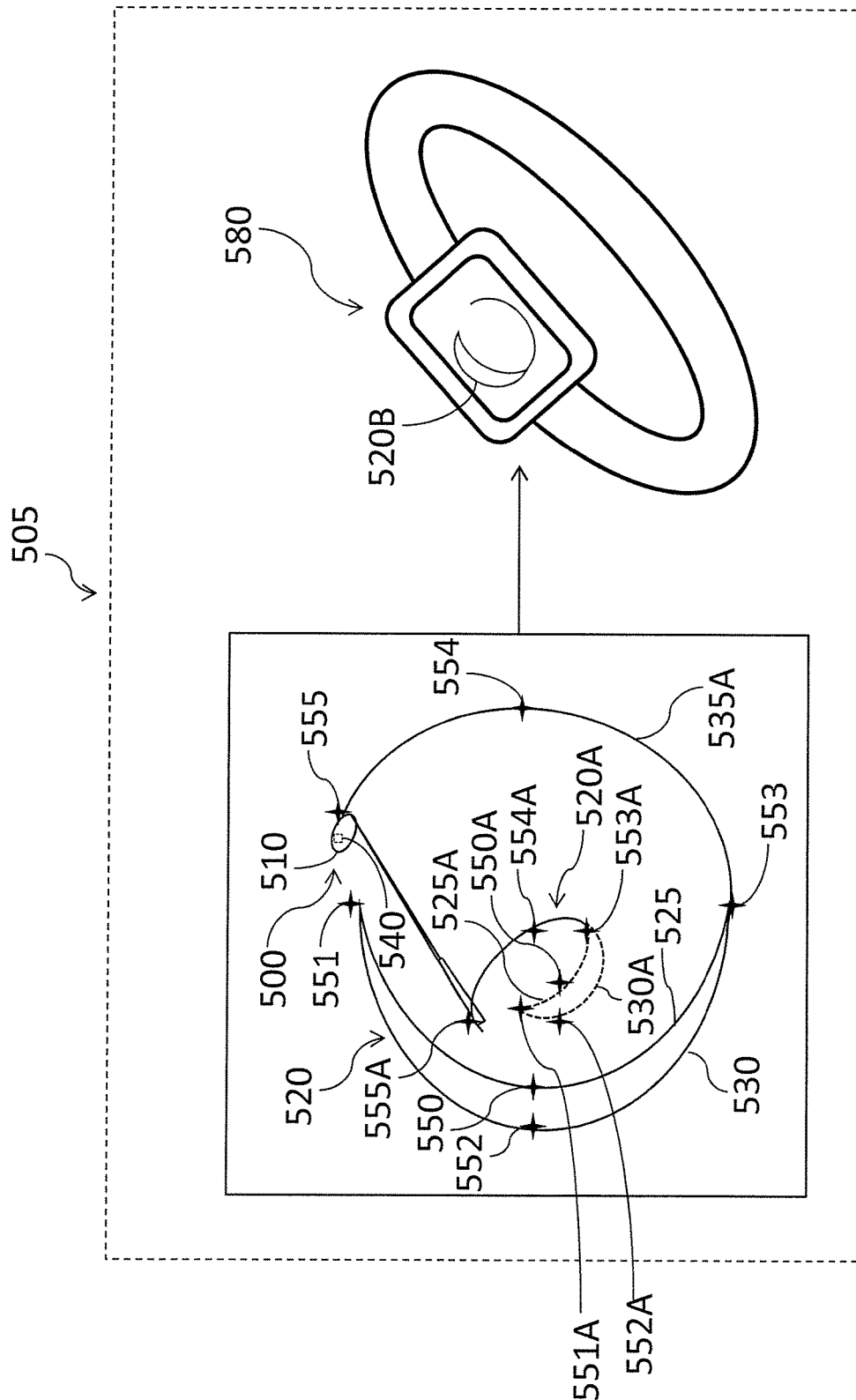
FIG. 5 illustrates another system of the present disclosure involving a learning module to develop predictive or hypothetical motion data for a sporting apparatus based on motion of a user of the sporting apparatus.

Such an example is illustrated in FIG. 5. In this example, a system generally 505 may comprise a sporting apparatus 500 such as a golf club comprising a monitoring device 540, positioned, for example, in the head 510 of the golf club. As previously described, the monitoring device 540 may communicate with one or more of a mobile device (not shown) and/or wearable device(s), generally 580. As illustrated, the monitoring device 540 may generate first swing data, generally 520, which may comprise, for example, a backswing swing path 525, a downswing swing path 530, and a follow through swing path 535. Similarly, the wearable device 580, which may be associated with a user, may be used to generate second swing data, illustrated in dashed lines, generally 520A, which may comprise, for example, a backswing swing path 525A, a downswing path 530A, and a follow through swing path 535A, all of which may depict the swing path of the wearable device and thus the user's wrist or hand (or other body part) to which the wearable device is secured.

As further illustrated, both the first swing data 520 and the second swing data 520A may comprise multiple data points, illustrated as stars 550, 551, 552, 553, 554, 555, and 550A, 551A, 552A, 553A, 554A, 555A, respectively, which data may be captured at predetermined positions of the swing. Such data points may comprise motion specific data, including one or more of instantaneous velocity, instantaneous spatial position, instantaneous acceleration, instantaneous attack angle, etc. In this example, data points 550, 550A comprise data captured at approximately the midpoint of the backswing; data points 551, 551A comprise data captured at approximately the top (or terminal point) of the swing; data points 552, 552A comprise data captured at approximately the midpoint of the downswing; data points 553, 553A comprise data captured at approximately the point of impact of the sporting apparatus 500 with a sports object, such as a golf ball; data points 554, 554A comprise data captured at approximately the midpoint of the follow through; and data points 555, 555A comprise data captured at approximately the completion of the swing for the sporting apparatus 500 and the wearable device 580, respectively. Other locations during the swing for data capture, and additional or fewer data captures are of course possible.

Once the first and second data is captured, it may be processed, for example, by averaging similar data achieved during multiple swings. The first and second data may also be correlated and/or calibrated in order to provide predictive values of swing data for the sporting apparatus 500, for example, the golf club head 510, without use of the monitoring device 540, rather, relying on only swing data from the wearable device 580.

The "learning" achieved by the learning module used to correlate the motion of the sporting apparatus with the motion of the user, as represented by a wearable device worn by the user, should ideally be accomplished for each individual user. Using golf as an example, each user may have a tendency to grip the club at a different location, grip different clubs at different locations, or may have other idiosyncrasies affecting how the individual's hand or wrist speed or other motion correlates to club head speed or other motion.

It should also be noted that the "learning" achieved by the learning module may be done without use of a human user. For example, as is known, golf club manufacturers typically rely on robot testing of golf equipment. Such robots may be configured with sensors and monitors to correlate an ideal user's wrist or hand speed (or other motion) to a club head speed (or other motion) for any range of wrist speeds, motions, and club lengths. Such acquired data may be imported into an RFID chip or other data storage device placed, for example, in the grip of each club, enabling the club to communicate, for example, with a wearable device associated with the user of the club that a particular club is being used and that the user's wrist speed or other motion data (for example as detected by the wearable device) will translate into a predetermined club head speed or other motion data for the golf club.

Figure 6:
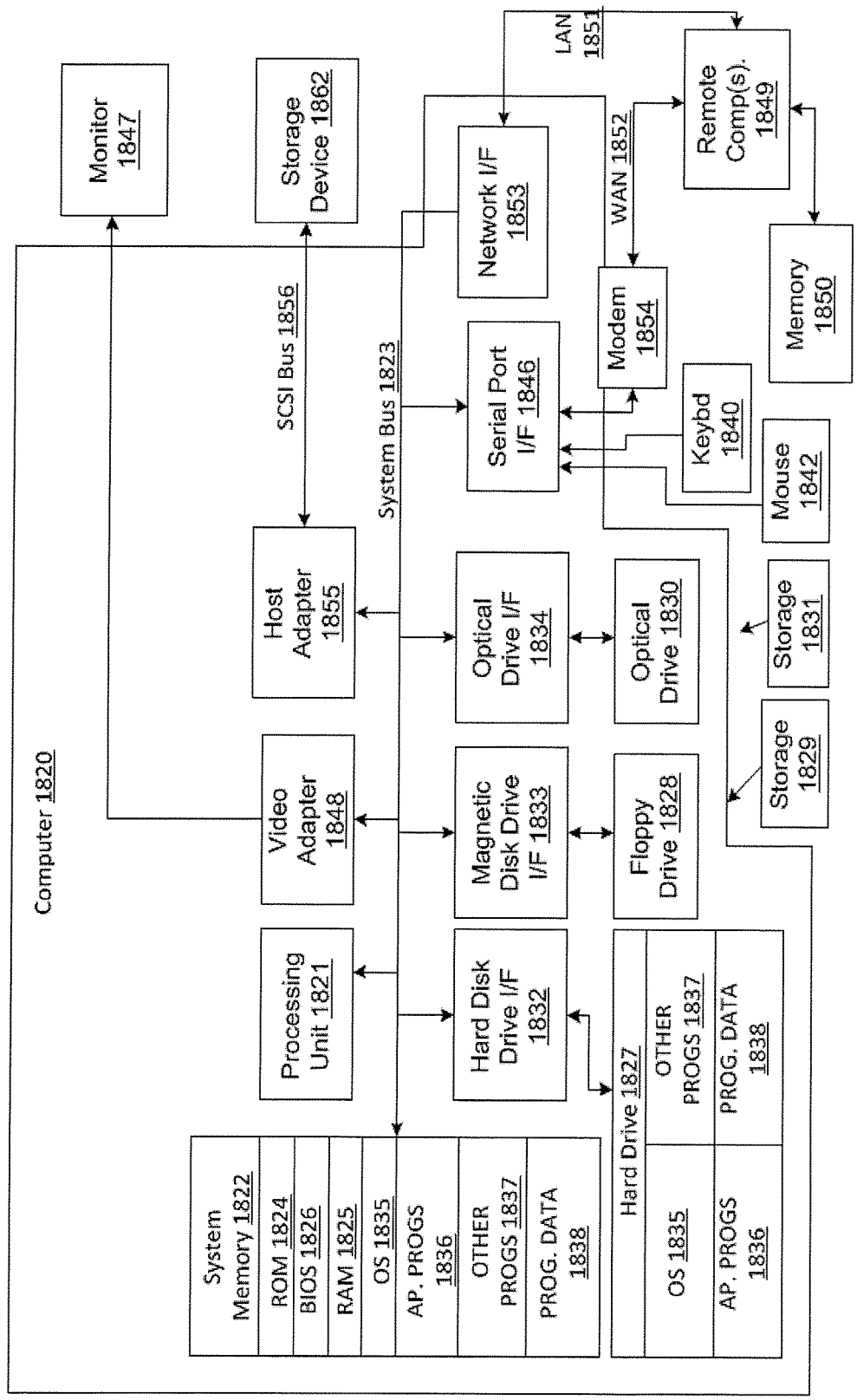
FIG. 6 is a block diagram representing a general purpose computer system in which aspects of the methods and systems disclosed herein or portions thereof may be incorporated.

FIG. 6 and the following discussion are intended to provide a brief general description of a suitable computing system in which the methods and systems disclosed herein and/or portions thereof may be implemented. Although not required, the methods and systems disclosed herein are described in the general context of computer-executable instructions, such as program modules, being executed by a computing system. Generally, program modules include routines, programs, objects, components, data structures and the like that perform particular tasks or implement particular abstract data types. It should be appreciated the methods and systems disclosed herein or portions thereof may be practiced with computer system configurations, including a client workstation, server, hand-held device, multi-processor system, microprocessor-based or programmable consumer electronic, network PC, minicomputer, mainframe computer, and the like. The methods and systems may also be practiced in distributed computing environments where tasks are performed by remote processing devices that are linked through a communications network. In a distributed computing environment, program modules may be located in both local and remote memory storage devices.

FIG. 6 is a block diagram representing a general purpose computer system in which aspects of the methods and systems disclosed herein or portions thereof may be incorporated. The monitoring devices (e.g., the monitoring devices 325, 330, 340, 350 etc.), the mobile device 370, the first wearable device 380, and/or sporting apparatus 390, among other devices may include one or more of the components of computing device 1820 as described herein. As shown, the exemplary general purpose computing system includes a computer 1820 or the like, including a processing unit 1821, a system memory 1822, and a system bus 1823 that couples various system components including the system memory to the processing unit 1821. The system bus 1823 may be any of several types of bus structures including a memory bus or memory controller, a peripheral bus, and a local bus using any of a variety of bus architectures. The system memory includes read-only memory (ROM) 1824 and random access memory (RAM) 1825. A basic input/output system 1826 (BIOS), containing the basic routines that help to transfer information between elements within the computer 1820, such as during start-up, is stored in ROM 1824.

The computer 1820 may further include a hard disk drive 1827 for reading from and writing to a hard disk (not shown), a magnetic disk drive 1828 for reading from or writing to a removable magnetic disk 1829, and an optical disk drive 1830 for reading from or writing to a removable optical disk 1831 such as a CD-ROM or other optical media. The hard disk drive 1827, magnetic disk drive 1828, and optical disk drive 1830 are connected to the system bus 1823 by a hard disk drive interface 1832, a magnetic disk drive interface 1833, and an optical drive interface 1834, respectively. The drives and their associated computer-readable media provide non-volatile storage of computer readable instructions, data structures, program modules and other data for the computer 1820. As described herein, computer-readable media is an article of manufacture and thus not a transient signal.

Although the exemplary environment described herein employs a hard disk, a removable magnetic disk 1829, and a removable optical disk 1831, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 1829, optical disk 1831, ROM 1824 or RAM 1825, including an operating system 1835, one or more application programs 1836, other program modules 1837 and program data 1838. A user may enter commands and information into the computer 1820 through input devices such as a keyboard 1840 and pointing device 1842. Other input devices (not shown) may include a microphone, joystick, game pad, satellite disk, scanner, or the like. These and other input devices are often connected to the processing unit 1821 through a serial port interface 1846 that is coupled to the system bus, but may be connected by other interfaces, such as a parallel port, game port, or universal serial bus (USB). A monitor 1847 or other type of display device is also connected to the system bus 1823 via an interface, such as a video adapter 1848. In addition to the monitor 1847, a computer may include other peripheral output devices (not shown), such as speakers and printers. Monitor 1847 or like display (e.g., display 386) may display data associated with the operation of a sporting apparatus and/or output based on data associated with the operation of a sporting apparatus. Graphical and/or numerical data from multiple sporting apparatuses (e.g., a first apparatus and a second apparatus, which was impacted by the first apparatus) may be shown on monitor 1847. The exemplary system of FIG. 6 also includes a host adapter 1855, a Small Computer System Interface (SCSI) bus 1856, and an external storage device 1862 connected to the SCSI bus 1856.

The computer 1820 may operate in a networked environment using logical connections to one or more remote computers, such as a remote computer 1849 (e.g., the monitoring device 230). The remote computer 1849 may be a personal computer, a server, a router, a network PC, a peer device or other common network node, and may include many or all of the elements described above relative to the computer 1820, although only a memory storage device 1850 has been illustrated in FIG. 6. The logical connections depicted in FIG. 6 include a local area network (LAN) 1851 and a wide area network (WAN) 1852. Such networking environments are commonplace in offices, enterprise-wide computer networks, intranets, and the Internet.

When used in a LAN networking environment, the computer 1820 is connected to the LAN 1851 through a network interface or adapter 1853. When used in a WAN networking environment, the computer 1820 may include a modem 1854 or other means for establishing communications over the wide area network 1852, such as the Internet. The modem 1854, which may be internal or external, is connected to the system bus 1823 via the serial port interface 1846. In a networked environment, program modules depicted relative to the computer 1820, or portions thereof, may be stored in the remote memory storage device. It will be appreciated that the network connections shown are exemplary and other means of establishing a communications link between the computers may be used.

Computer 1820 may include a variety of computer readable storage media. Computer readable storage media can be any available media that can be accessed by computer 1820 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1820. Combinations of any of the above should also be included within the scope of computer readable media that may be used to store source code for implementing the methods and systems described herein. Any combination of the features or elements disclosed herein may be used in one or more examples.

Figure 7:
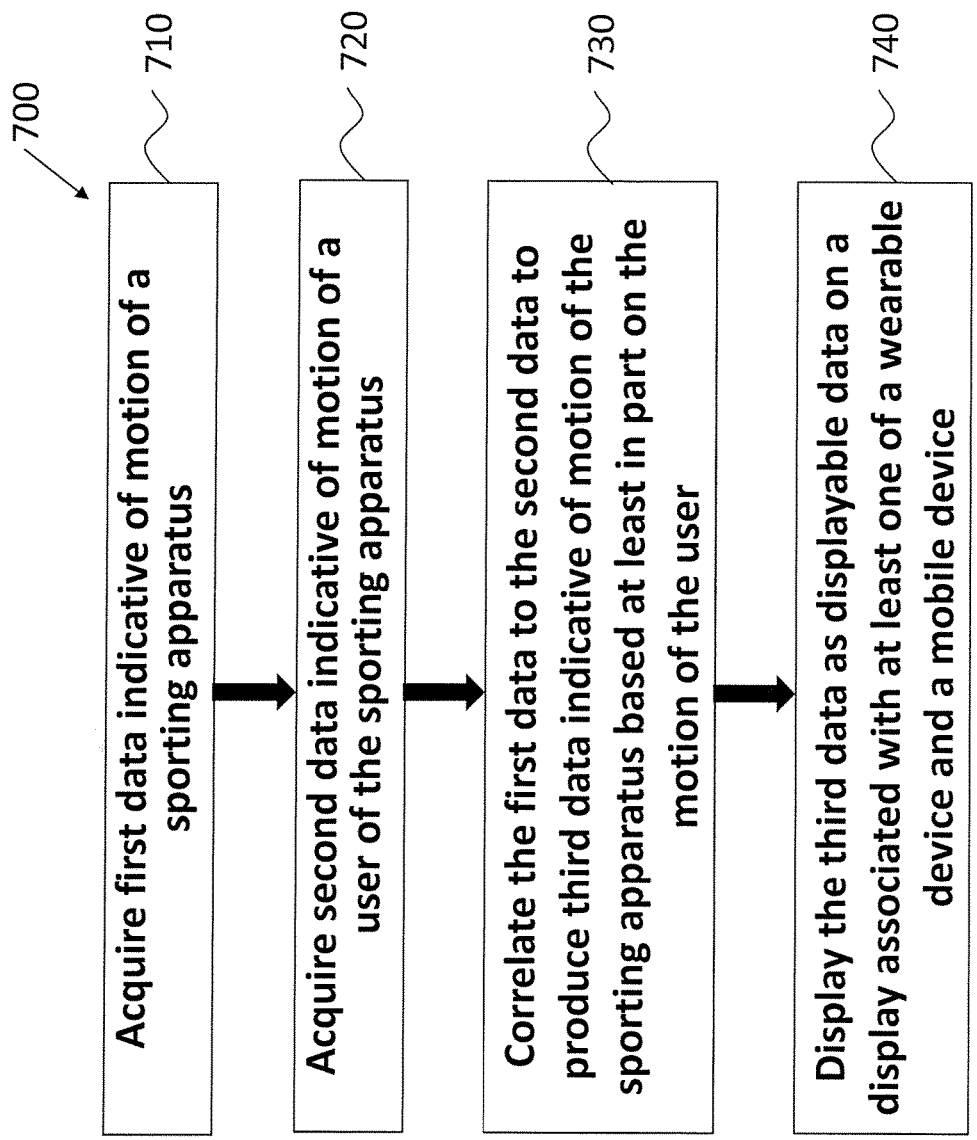
FIG. 7 is a flowchart diagram describing a method for use by systems and apparatus of the present disclosure.

FIG. 7 is a flowchart diagram illustrating a method for use by systems and apparatus of the present disclosure. The approach and technique indicated by flowchart 700 are sufficient to describe at least one implementation of the present disclosure, however, other implementations of the disclosure may utilize approaches and techniques different from those shown in flowchart 700. Furthermore, while flowchart 700 is described with respect to FIG. 3, the disclosed concepts are not intended to be limited by specific features shown and described with respect to FIG. 3. Furthermore, with respect to the method illustrated in FIG. 7, it is noted that certain details and features have been left out of flowchart 700 in order not to obscure the discussion of disclosed features in the present application.

Flowchart 700 (at operation 710) includes acquiring first data indicative of motion of a sporting apparatus. For example, the data 351, 353, 355, and/or 357 is acquired by the sporting apparatus 300 using at least one of the monitoring devices 325, 335, 340, and 350. The data 351, 353, 355, and/or 357 may then be transmitted to at least one of the first wearable device 380 and the mobile device 370. The mobile device 370 may then transmit the data 351, 353, 355, and/or 357 as transmitted data 352 to the first wearable device 380, for example.

Flowchart 700 (at operation 720) includes acquiring second data indicative of motion of a user of the sporting apparatus. For example, the data 397 captured by the electrical components 388 and/or 389 of the first wearable device 380 is acquired by the portable electronic device 384, and the data 399 captured by the monitoring device 395 is also acquired by the mobile device 370 and/or the first wearable device 380. The data 397 captured by the electrical components 388 and/or 389, and/or the data 399 captured by the monitoring device 395 may then be transmitted to the mobile device 370 and/or stored on the first wearable device 380. In some implementations, the first wearable device 380 may receive the data 351, 353, 355, and/or 357 from the sporting apparatus 300 as well as the data 399 from the second wearable device 301 and store the data 351, 353, 399, 355, and/or 357 in addition to the data 397 captured by the electrical components 388 and/or 390. However, in other implementations, the mobile device 370 may receive and store both the data 351, 353, 355, 399, and/or 357 in addition to the data 397 captured by the electrical components 388 and/or 389. The data 351, 353, 355, and/or 357 in addition to the data 397 captured by the electrical components 388 and/or 389 may be shared between the mobile device 370, the first wearable device 380, and the second wearable device 301 using RFID, Bluetooth, ZigBee, or any suitable method as known in the art.

As discussed above, in some aspects of the present disclosure there may be any number of wearable devices. In such an implementation, the acquiring of the second data may include acquiring data from the first wearable device 380 and the second wearable device 301, in addition to other wearable devices. For example, in addition to the first wearable device 380 and the second wearable device 301, which may be a watch and a glove, respectively, the user may also have at least one of a hat, a shirt, and shoes each including electrical components, such as monitoring devices, capable of capturing data as well as transmitting data to, and receiving data from the mobile device 370 and any of the other wearable devices, including first wearable device 380. It should here be noted that although operation 710 is illustrated in FIG. 7 as preceding operation 720, that it is possible and within the scope of the present disclosure for operation 720 to precede operation 710 and/or for operations 710 and 720 to occur simultaneously. Flowchart 700 (at operation 730) includes correlating the first data to the second data to produce third data indicative of motion of the sporting apparatus based at least in part, and in one aspect based solely, on the motion of the user. For example, mobile device 370 and/or first wearable device 380 may produce third data indicative of the motion of the sporting apparatus 300 based on data 352, 397, 399, 353, 351, 355, and/or 357, such as the motion of the user's wrist as captured by the wearable device 380 and/or motion of the user's hand as captured by the wearable device 301. Correlating the first data to the second data may comprise processing the first and second data via a learning module to produce the third data. The third data may comprise predictive data based only on motion of the user. The motion of the user may be one or more of predicted motion of the user, for example, based on motion of the sporting apparatus, stored data comprising a plurality of motions of the user, and real time data comprising motion of the user.

Flowchart 700 (at operation 740) includes displaying the third data as displayable data on a display associated with at least one of a wearable device and a mobile device. For example, the displayable data 353 is displayed on a display 386 and/or the display associated with mobile device 370.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. The use of the term "correlate" is exemplary and other ways of determining a relationship based on data are contemplated herein. It is contemplated herein that the concepts discussed herein are applicable to apparatuses other than sporting apparatuses.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A device comprising:
    a processor; and
    a memory coupled with the processor, the memory comprising executable instructions that when executed by the processor cause the processor to effectuate operations comprising:

receiving first data, the first data indicative of operation of a first sporting apparatus;

processing the first data for further transmission as displayable information;

providing the displayable information for display on a wearable device;

based on a location of the wearable device or a mobile device associated with the wearable device, providing instructions to enter into an off mode, wherein the off mode comprises a sleep mode that prevents the wearable device or the mobile device from displaying second data while the wearable device still receives or transmits the second data, the second data indicative of operation of the first sporting apparatus while the wearable device is in the off mode; and providing instructions to enter into the off mode based on a date.

2. The device of claim 1, wherein the instructions to enter into the off mode are provided to the wearable device and to a monitoring device, wherein the monitoring device captures the first data and the second data.

3. The device of claim 1, wherein the first data is indicative of being from a monitoring device associated with the first sporting apparatus, the monitoring device comprises an off mode.

4. The device of claim 1, wherein the first sporting apparatus is selected from the group comprising a golf club, a tennis racket, a squash racket, a racquetball racket, a baseball bat, a softball bat, a cricket bat, a hockey stick, a sports shoe, a ball, a puck, a boxing glove, sports apparel, or a lacrosse stick.

5. The device of claim 1, wherein the displayable information comprises at least one of velocity, acceleration, or deceleration of the first sporting apparatus.

6. The device of claim 1, wherein the displayable information comprises at least one of attack angle, azimuth, impact, swing length, or swing path of the first sporting apparatus.

7. The device of claim 1, wherein the device is at least one of a mobile device, the wearable device, or a monitoring device.

8. The device of claim 1, wherein the first data is indicative of the first sporting apparatus impacting a second sporting apparatus, the second sporting apparatus comprising a monitoring device that collects the second data associated with the first sporting apparatus impacting the second sporting apparatus.

9. The device of claim 8, wherein:

the first sporting apparatus is selected from the group comprising a golf club, a tennis racket, a squash racket, a racquetball racket, a baseball bat, a softball bat, a cricket bat, a hockey stick, a sports shoe, a boxing glove, sports apparel, or a lacrosse stick, and the second sporting apparatus is selected from the group comprising a golf ball, a tennis ball, a squash ball, a racquetball, a baseball, a softball, a cricket ball, a hockey puck, a soccer ball, a football, a punching bag, and a lacrosse ball.

10. The device of claim 9, wherein the second data comprises at least one of velocity, acceleration, deceleration, compression, spin rate, launch angle, azimuth, spin direction, location, altitude, carry distance, roll distance, flight distance, and flight path of the second sporting apparatus.

11. The device of claim 1, wherein the second data is displayed on the wearable device as second displayable information in another location.

12. A device comprising:

a processor; and a memory coupled with the processor, the memory comprising executable instructions that when executed by the processor cause the processor to effectuate operations comprising:

receiving first data, the first data indicative of operation of a sporting apparatus; and receiving instructions to enter into an off mode based on a criteria associated with a monitoring device, the off mode comprising a sleep mode that prevents a wearable device from transmission or reception of the first data while the monitoring device still receives the first data;

recording a location of the device; and recording a duration of time the device is in the off mode while in the location.

13. The device of claim 12, wherein the criteria comprises the location.

14. The device of claim 12, wherein the device is a wearable device or the monitoring device.

15. The device of claim 12, wherein the criteria comprises a date.

16. The device of claim 12, wherein the monitoring device captures the first data.

* * * * *